(12) United States Patent
Busch et al.

(10) Patent No.: US 7,027,974 B1
(45) Date of Patent: Apr. 11, 2006

(54) ONTOLOGY-BASED PARSER FOR NATURAL LANGUAGE PROCESSING

(75) Inventors: Justin Eliot Busch, Irvine, CA (US); Albert Deirchow Lin, San Diego, CA (US); Patrick John Graydon, Windsor, CA (US); Maureen Caudill, San Diego, CA (US)

(73) Assignee: Science Applications International Corporation, San Diego, CA (US)

( * ) Notice: Subject to any disclaimer, the term of this patent is extended or adjusted under 35 U.S.C. 154(b) by 1235 days.

(21) Appl. No.: 09/697,676

(22) Filed: Oct. 27, 2000

(51) Int. Cl.
*G10L 13/08* (2006.01)

(52) U.S. Cl. .................................. 704/4; 704/9; 707/4

(58) Field of Classification Search .................. 704/4, 704/9; 707/4
See application file for complete search history.

(56) References Cited

U.S. PATENT DOCUMENTS

| 4,270,182 A | 5/1981 | Asija |
| 4,864,502 A | 9/1989 | Kucera et al. |

(Continued)

FOREIGN PATENT DOCUMENTS

| EP | 0413132 A | 2/1991 |
| WO | WO 0049517 A | 8/2000 |

OTHER PUBLICATIONS

Koller, D., and Sahami, M. Hierarchically classifying documents using very few words. ICML-97; Proceedings of the Fourteenth International Conference on Machine Learning, 1997.

Susan T. Dumais, John Platt, David Hecherman, Mehran Sahami: Inductive Learning Algorithms and Representations for Text Categorization. CIKM pp. 148–155, 1998.

Andrew McCallum, Kamal Nigam, Jason Rennie and Kristie Seymore. Building Domain–Specific Search Engines with Machine Learning Techniques. AAAI–99 Spring Symposium, 1999.

M. Sahami, S. Dumais, D. Heckerman, and E. Horvitz. A Bayesian approach to filtering junk e–mail. AAAI Workshop on Learning for Text Categorization, Jul. 1998, Madison, Wisconsin.

Larkey, Leah S. (1999) A Patent Search and Classification System In Digital Libraries 99—The Fourth ACM Conference on Digital Libraries (Berkeley, CA, Aug. 11–14 1999) ACM Press, pp. 79–87.

Teuvo Kohonen, *Self Organization and Associative memory*, $3^{rd}$ Edition, Table of Contents, Springer–Verlag, New York, NY 1989.

(Continued)

*Primary Examiner*—Daniel Abebe
(74) *Attorney, Agent, or Firm*—Banner & Witcoff, Ltd.

(57) ABSTRACT

An ontology-based parser incorporates both a system and method for converting natural-language text into predicate-argument format that can be easily used by a variety of applications, including search engines, summarization applications, categorization applications, and word processors. The ontology-based parser contains functional components for receiving documents in a plurality of formats, tokenizing them into instances of concepts from an ontology, and assembling the resulting concepts into predicates. The ontological parser has two major functional elements, a sentence lexer and a parser. The sentence lexer takes a sentence and converts it into a sequence of ontological entities that are tagged with part-of-speech information. The parser converts the sequence of ontological entities into predicate structures using a two-stage process that analyzes the grammatical structure of the sentence, and then applies rules to it that bind arguments into predicates.

42 Claims, 7 Drawing Sheets

U.S. PATENT DOCUMENTS

| | | |
|---|---|---|
| 4,887,212 A | 12/1989 | Zamora et al. |
| 4,914,590 A | 4/1990 | Loatman et al. |
| 4,984,178 A | 1/1991 | Hemphill et al. |
| 5,056,021 A | 10/1991 | Ausborn |
| 5,101,349 A | 3/1992 | Tokuume et al. |
| 5,146,406 A | 9/1992 | Jensen |
| 5,237,502 A | 8/1993 | White et al. |
| 5,297,039 A | 3/1994 | Kanaegami et al. |
| 5,309,359 A | 5/1994 | Katz et al. |
| 5,317,507 A | 5/1994 | Gallant |
| 5,321,833 A | 6/1994 | Chang et al. |
| 5,331,556 A | 7/1994 | Black, Jr. et al. |
| 5,386,556 A | 1/1995 | Hedin et al. |
| 5,404,295 A | 4/1995 | Katz et al. |
| 5,418,948 A | 5/1995 | Turtle |
| 5,446,891 A | 8/1995 | Kaplan et al. |
| 5,475,588 A | 12/1995 | Schabes et al. |
| 5,535,382 A | 7/1996 | Ogawa |
| 5,576,954 A | 11/1996 | Driscoll |
| 5,619,709 A | 4/1997 | Caid et al. |
| 5,675,710 A | 10/1997 | Lewis |
| 5,680,627 A | 10/1997 | Anglea et al. |
| 5,687,384 A | 11/1997 | Nagase |
| 5,694,523 A | 12/1997 | Wical |
| 5,694,592 A | 12/1997 | Driscoll |
| 5,706,497 A | 1/1998 | Takahashi et al. |
| 5,721,902 A | 2/1998 | Schultz |
| 5,721,938 A | 2/1998 | Stuckey |
| 5,761,389 A | 6/1998 | Maeda et al. |
| 5,790,754 A | 8/1998 | Mozer et al. |
| 5,794,050 A * | 8/1998 | Dahlgren et al. ............ 717/144 |
| 5,802,515 A | 9/1998 | Adar et al. |
| 5,835,087 A | 11/1998 | Herz et al. |
| 5,864,855 A | 1/1999 | Ruocco et al. |
| 5,870,701 A | 2/1999 | Wachtel |
| 5,870,740 A | 2/1999 | Rose et al. |
| 5,873,056 A | 2/1999 | Liddy et al. |
| 5,893,092 A | 4/1999 | Driscoll |
| 5,915,249 A | 6/1999 | Spencer |
| 5,920,854 A | 7/1999 | Kirsch et al. |
| 5,930,746 A | 7/1999 | Ting |
| 5,933,822 A | 8/1999 | Braden-Harder et al. |
| 5,940,821 A | 8/1999 | Wical |
| 5,953,718 A | 9/1999 | Wical |
| 5,960,384 A | 9/1999 | Brash |
| 5,963,940 A | 10/1999 | Liddy et al. |
| 5,974,412 A | 10/1999 | Hazlehurst et al. |
| 5,974,455 A | 10/1999 | Monier |
| 6,006,221 A | 12/1999 | Liddy et al. |
| 6,012,053 A | 1/2000 | Pant et al. |
| 6,021,387 A | 2/2000 | Mozer et al. |
| 6,021,409 A | 2/2000 | Burrows |
| 6,026,388 A | 2/2000 | Liddy et al. |
| 6,038,560 A | 3/2000 | Wical |
| 6,047,277 A | 4/2000 | Parry et al. |
| 6,049,799 A | 4/2000 | Mangat et al. |
| 6,055,531 A | 4/2000 | Bennett et al. |
| 6,076,051 A | 6/2000 | Messerly et al. |
| 6,233,575 B1 | 5/2001 | Agrawal et al. |
| 6,778,979 B1 * | 8/2004 | Grefenstette et al. .......... 707/3 |
| 2002/0143755 A1 | 10/2002 | Wynblatt et al. |

OTHER PUBLICATIONS

Dunja Mladinic, Turning Yahoo into an Automatic Web Page Classifier, ECAI 98:13th European Conference on Artificial Intelligence, Brighton, UK, Aug. 23 to Aug. 28, 1998, pp. 473–474, John Wiley & Sons, Ltd.

Tom M. Mitchell, "Machine Learning", WCB/McGraw–Hill 1997.

Choon Yang Quek, "Classification of World Wide Web Documents", Senior Honors Thesis, CMU.

Bresnan, Joan (ed.). 1982. The Mental Representation of Grammatical Relations. Cambridge, MA: MIT Press.

Charniak, Eugene. 1993. Statistical Language Learning. Cambridge, MA: MIT Press.

Domingos, Pedro and Michael Pazzani. 1997. "On the Optimality of the Simple Bayesian Classifier Under Zero–One Loss." Machine Learning 29:103–130.

Duda, Richard and Peter Hart. 1973. Pattern Classification and Scene Analysis. New York, NY: Wiley.

Gold, Mark. 1967. "Language Identification in the Limit." Information and Control 10:447–474.

Horning, James. 1969. A Study of Grammatical Inference. Ph.D. thesis, Stanford.

Magerman, David and Mitchell Marcus. 1991. "Pearl: A Probabilistic Chart Parser." Proceedings of the $2^{nd}$ International Workshop for Parsing Technologies.

Manning, Christopher and Hinrich Schutze. 1999. Foundations of Statistical Natural Language Processing. Cambridge, MA: MIT Press.

McCallum, A., K. Nigam, S. Thrun, and T. Mitchell. 1988. "Learning to Classify Text from Labeled and Unlabeled Documents." Proceedings of the 1998 National Conference on Artificial Intelligence, Jul. 1998.

McCallum, A., R. Rosenfeld., T. Mitchell and A. Ng. 1998. "Improving Text Classification by Shrinkage in a Hierarchy of Classes," Proceedings of the 1998 International Conference on Machine Learning.

Pollard, Carl and Ivan Sag. 1994. Head–Driven Phrase Structure Grammar. Chicago, IL: University of Chicago Press.

Dirk van Eylen, "Ranking of search results using AltaVista", http://ping4.ping.be/~ping0658/avrank.html.

Avrim Blum, Tom Mitchell, "Combining Labeled and Unlabeled Data with Co–Training", Proceedings of the 1998 conference on Computational Learning Theory.

* cited by examiner

ONTOLOGY-BASED PARSER FOR NATURAL LANGUAGE PROCESSING

Applicants hereby incorporate by reference co-pending application Ser. No. 09/627,295 filed in the U.S. Patent and Trademark Office on Jul. 27, 2000, entitled "Concept-Based Search and Retrieval System."

BACKGROUND OF THE INVENTION

1. Field of the Invention

The present invention relates to an ontological parser for natural language processing. More particularly, the present invention relates to a system and method for ontological parsing of natural language that provides a simple knowledge-base-style representation format for the manipulation of natural-language documents. The system utilizes unstructured text as input and produces a set of data structures representing the conceptual content of the document as output. The data is transformed using a syntactic parser and ontology. The ontology is used as a lexical resource. The output that results is also an ontological entity with a structure that matches the organization of concepts in natural language. The resulting ontological entities are predicate-argument structures designed in accordance with the best practices of artificial intelligence and knowledge-base research.

The ontology-based parser is designed around the idea that predicate structures represent a convenient approach to searching through text. Predicate structures constitute the most compact possible representation for the relations between grammatical entities. Most of the information required to construct predicates does not need to be stored, and once the predicates have been derived from a document, the predicates may be stored as literal text strings, to be used in the same way. The system and method of ontology-based parsing of the present invention is directed towards techniques for deriving predicate structures with minimal computational effort.

In addition, the ontology-based parser is designed to permit the use of arithmetic operations instead of string operations in text-processing programs, which employ the ontology-based parser. The output predicate structures contain numeric tags that represent the location of each concept within the ontology. The tags are defined in terms of an absolute coordinate system that allows calculation of conceptual similarity according to the distance within a tree structure. All applications making use of the fact that the output of the ontology-based parser is an ontological entity may realize enormous speed benefits from the parameterized ontology that the parser utilizes.

2. Background of the Invention

Numerous techniques have been developed to process natural language input. These techniques tend to be complicated and cumbersome. Often numerous passes through the input sentence(s) are required to fully parse the input, thereby adding to the time required to parse the input. Often the previous techniques do not have very robust feature checking capabilities. In particular, the techniques do not check for both syntactic and semantic compatibility. Often these techniques expend significant time trying to parse words that can be pruned or filtered according to their information.

The previous techniques of natural language processing are often limited to the performance of a particular purpose and cannot be used for other purposes. Conventional parsing techniques may be designed to function as part of a grammar checking system, but cannot function as part of a search engine, summarization application, or categorization application.

Furthermore, conventional parsing techniques do not take full advantage of an ontology as a lexical resource. This limits the versatility of the techniques.

U.S. Pat. No. 4,864,502 to Kucera et al. discloses a device that tags and parses natural-language sentences, and provides interactive facilities for grammar correction by an end user. The system taught by Kucera et al. has a complicated analysis, and cannot afford semantic status to each word relative to all the other words within the dictionary. The Kucera et al. system uses three parsing stages, each of which needs more than one pass through the sentence to complete its analysis.

U.S. Pat. No. 4,887,212 to Zamora et al. discloses a parser for syntactic analysis of text using a fast and compact technique. After part-of-speech tagging and disambiguation, syntactic analysis occurs in four steps. The grammar of Zamora et al. operates by making multiple passes to guess at noun phrases and verb phrases and then attempts to reconcile the results. Furthermore, the grammar violation checking technique of the Zamora et al. system checks only for syntactic correctness.

U.S. Pat. No. 4,914,590 to Loatman et al. discloses a natural language understanding system. The goal of the Loatman et al. system is to provide a formal representation of the context of a sentence, not merely the sentence itself. Case frames used in Loatman et al. require substantial hard-coded information to be programmed about each word, and a large number of case frames must be provided to obtain reasonable coverage.

Tokuume et al., U.S. Pat. No. 5,101,349, discloses a natural language processing system that makes provisions for validating grammar from the standpoint of syntactic well-formedness, but does not provide facilities for validating the semantic well-formedness of feature structures.

U.S. Pat. No. 5,146,496 to Jensen discloses a technique for identifying predicate-argument relationships in natural language text. The Jensen system must create intermediate feature structures to store semantic roles, which are then used to fill in predicates whose deep structures have missing arguments. Post-parsing analysis is needed and the parsing time is impacted by the maintenance of these variables. Additionally, semantic feature compatibility checking is not possible with Jensen's system.

U.S. Pat. No. 5,721,938 to Stuckey discloses a parsing technique, which organizes natural language into symbolic complexes, which treat all words as either nouns or verbs. The Stuckey system is oriented towards grammar-checker-style applications, and does not produce output suitable for a wide range of natural-language processing applications. The parser of the Stuckey system is only suitable for grammar-checking applications.

U.S. Pat. No. 5,960,384 to Brash discloses a parsing method and apparatus for symbolic expressions of thought such as English-language sentences. The parser of the Brash system assumes a strict compositional semantics, where a sentence's interpretation is the sum of the lexical meanings of nearby constituents. The Brash system cannot accommodate predicates with different numbers of arguments, and makes an arbitrary assumption that all relationships are transitive. The Brash system makes no provisions for the possibility that immediate relationships are not in fact the correct expression of sentence-level concepts, because it assumes that syntactic constituency is always defined by immediate relationships. The Brash system does not incorporate ontologies as the basis for its lexical resource, and therefore does not permit the output of the parser to be easily modified by other applications. Furthermore, the Brash system requires target languages to have a natural word order that already largely corresponds to the style of its syntactic analysis. Languages such as Japanese or Russian, which permit free ordering of words, but mark intended usage by morphological changes, would be difficult to parse using the Brash system.

The patent to Hemphill et al. (U.S. Pat. No. 4,984,178) discloses a chart parser designed to implement a probabilistic version of a unification-based grammar. The decision-making process occurs at intermediate parsing stages, and parse probabilities are considered before all parse paths have been pursued. Intermediate parse probability calculations have to be stored, and the system has to check for intermediate feature clashes.

U.S. Pat. No. 5,386,406 to Hedin et al. discloses a system for converting natural-language expressions into a language-independent conceptual schema. The output of the Hedin et al. system is not suitable for use in a wide variety of applications (e.g. machine translation, document summarization, categorization). The Hedin et al. system depends on the application in which it is used.

SUMMARY OF THE INVENTION

The foregoing and other deficiencies are addressed by the present invention, which is directed to an ontology-based parser for natural language processing. More particularly, the present invention relates to a system that provides a simple knowledge-base-style representation format for the manipulation of natural-language documents. The system utilizes unstructured text as input and produces a set of data structures representing the conceptual content of the document as output. The data is transformed using a syntactic parser and ontology. The ontology is used as a lexical resource. The output that results is also an ontological entity with a structure that matches the organization of concepts in natural language. The resulting ontological entities are predicate-argument structures designed in accordance with the best practices of artificial intelligences and knowledge-base research.

The design of the ontology-based parser is based on the premise that predicate structures represent a convenient approach to searching through text. Predicate structures constitute the most compact possible representation for the relations between grammatical entities. Most of the information required to construct predicates does not need to be stored, and once the predicates have been derived from a document, the predicates may be stored as literal text strings, to be used in the same way. The ontology-based parser of the present invention is directed towards techniques for deriving predicate structures with minimal computational effort.

In addition, the ontology-based parser is designed to permit the use of arithmetic operations instead of string operations in text-processing programs, which employ the ontology-based parser. The output predicate structures contain numeric tags that represent the location of each concept within the ontology. The tags are defined in terms of an absolute coordinate system that allows calculation of conceptual similarity according to the distance within a tree structure. All applications making use of the fact that the output of the ontology-based parser is an ontological entity may realize enormous speed benefits from the parameterized ontology that the parser utilizes.

The present system imposes a logical structure on text, and a semantic representation is the form used for storage. The present system further provides logical representations for all content in documents. The advantages of the present system are the provision of a semantic representation of comparable utility with significantly reduced processing requirements, and no need to train the system to produce semantic representations of text content.

The system and method for ontological parsing of natural language according to the present invention has a far simpler analysis process than conventional parsing techniques, and utilizes a dictionary containing tags with syntactic information. The preferred implementation of the present system and method affords semantic status to each word relative to all the other words within the dictionary, and uses a single-pass context-free grammar to provide complete predicate structures containing subject and object relationships. The system and method of the present invention also provides a robust feature-checking system that accounts for semantic compatibility as well as syntactic compatibility.

The ontology of the present invention converts all inflected words to their canonical forms. Additionally, the system and method can filter lexical items according to their information content. For example, in an information retrieval application, it is capable of pulling out stopwords and unintended query words (as in the pseudo-concept and pseudo-predicate filters). In one embodiment, the grammar of the system and method of the present invention operates in a single pass to produce predicate structure analyses, and groups noun phrases and verb phrases as they occur, not by making multiple passes to guess at them and then attempting to reconcile the results. In the embodiment discussed above, the grammar violation checking of the system and method of the present invention filters both by the probability of a syntactically successful parse and the compatibility of the lexical semantics of words in the ontology. The compatibility referred to here is the self-consistent compatibility of words within the ontology; no particular requirement is imposed to force the ontology to be consistent with anything outside the present system.

In the predicate representation scheme of the present invention, there are only a few distinct frames for predicate structures, as many as needed to cover the different numbers of arguments taken by different verbs. Predicates may be enhanced with selectional restriction information, which can be coded automatically for entire semantic classes of words, rather than on an individual basis, because of the ontological scheme.

The manner in which the present invention constructs parse trees, from which predicate structures and their arguments can be read directly, uses context-free grammars, which result in faster execution. The system of the present invention maintains arguments as variables during the parsing process, and automatically fills in long-distance dependencies as part of the parsing process. No post-parsing analysis is needed to obtain this benefit, and the parsing time is not impacted by the maintenance of these variables, thus resulting in faster parsing execution. Additionally, the ontologies used permit semantic feature compatibility checking.

The system and method of the present invention isolates predicate-argument relationships into a consistent format regardless of text types. The predicate-argument relationships can be used in search, grammar-checking, summarization, and categorization applications, among others.

The system and method of the present invention can accommodate predicates with different numbers of arguments, and does not make arbitrary assumptions about predicate transitivity or intransitivity. Instead the system and method of the present invention incorporates a sophisticated syntactic analysis component, which allows facts about parts-of-speech to determine the correct syntactic analysis. Additionally, by incorporating ontologies as the basis for the lexical resource, the present invention permits the output of the parser to be easily modified by other applications. For example, a search engine incorporating our parser can easily substitute words corresponding to different levels of abstraction into the arguments of a predicate, thus broadening the search. As long as grammatical roles can be identified, the present system and method can be easily adapted to any language. For example, certain case-marked languages, such as Japanese or German, can be parsed through a grammar which simply records the grammatical relationships encoded by particular markers, and the resulting output is still compatible with the parsing results achieved for other languages.

From the foregoing, it is an object of the present invention to provide a system and method for parsing natural language input that provides a simple knowledge-base-style representation format for the manipulation of natural-language documents.

Another object of the present invention is to provide a system and method for parsing natural language input that utilizes unstructured text as an input and produces a set of data structures representing the conceptual content of the document as output, where the output is an ontological entity with a structure that matches the organization of concepts in natural language.

Still another object of the present invention is to provide a system and method for parsing natural language input that transforms data using a syntactic parser and ontology, where the ontology is used as a lexical resource.

Yet another object of the present invention is to provide a system and method for parsing natural language input that provides ontological entities as output that are predicate-argument structures.

Another object of the present invention is to provide a system and method for parsing natural language input that derives predicate structures with minimal computational effort.

Still another object of the present invention is to provide a system and method for parsing natural language input that permits the use of arithmetic operations in text-processing programs, where the output predicate structures contain numeric tags that represent the location of each concept within the ontology, and the tags are defined in terms of an absolute coordinate system that allows calculation of conceptual similarity according to the distance within a tree structure.

Another object of the present invention is to provide a system and method for parsing natural language input that realizes enormous speed benefits from the parameterized ontology that the parser utilizes.

BRIEF DESCRIPTION OF THE DRAWINGS

These and other attributes of the present invention will be described with respect to the following drawings in which.

DETAILED DESCRIPTION OF THE INVENTION

In the following detailed discussion of the present invention, numerous terms, specific to the subject matter of a system and method for concept-based searching, are used. In order to provide complete understanding of the present invention, the meaning of these terms is set forth below as follows:

The term concept as used herein means an abstract formal representation of meaning, which corresponds to multiple generic or specific words in multiple languages. Concepts may represent the meanings of individual words or phrases, or the meanings of entire sentences. The term predicate means a concept that defines an n-ary relationship between other concepts. A predicate structure is a data type that includes a predicate and multiple additional concepts; as a grouping of concepts, it is itself a concept. An ontology is a hierarchically organized complex data structure that provides a context for the lexical meaning of concepts. An ontology may contain both individual concepts and predicates.

The ontology-based parser incorporates both a system and method for converting natural-language text into predicate-argument format that can be easily used by a variety of applications, including search engines, summarization applications, categorization applications, and word processors. The ontology-based parser contains functional components for receiving documents in a plurality of formats, tokenizing them into instances of concepts from an ontology, and assembling the resulting concepts into predicate structures.

The ontological parser is designed to be modular, so that improvements and language-specific changes can be made to individual components without reengineering the other components. The components are discussed in detail below.

The ontological parser has two major functional elements, a sentence lexer and a parser. The sentence lexer takes a sentence and converts it into a sequence of ontological entities that are tagged with part-of-speech information. The parser converts the sequence of ontological entities into predicate structures using a two-stage process that analyzes the grammatical structure of the sentence, and then applies rules to it that bind arguments into predicates.

Ontological parsing is a grammatical analysis technique built on the proposition that the most useful information that can be extracted from a sentence is the set of concepts within it, as well as their formal relations to each other. Ontological parsing derives its power from the use of ontologies to situate words within the context of their meaning, and from the fact that it does not need to find the correct purely syntactic analysis of the structure of a sentence in order to produce the correct analysis of the meaning of a sentence.

An ontological parser is a tool that transforms natural-language sentences into predicate structures. Predicate structures are representations of logical relationships between the words in a sentence. Every predicate structure contains a predicate, which is either a verb or a preposition, and a set of arguments, which may be any part of speech. Predicates are words which not only have intrinsic meaning of their own, but which also provide logical relations between other concepts in a sentence. Those other concepts are the arguments of the predicate, and are generally nouns, because predicate relationships are usually between entities.

Figure 1:
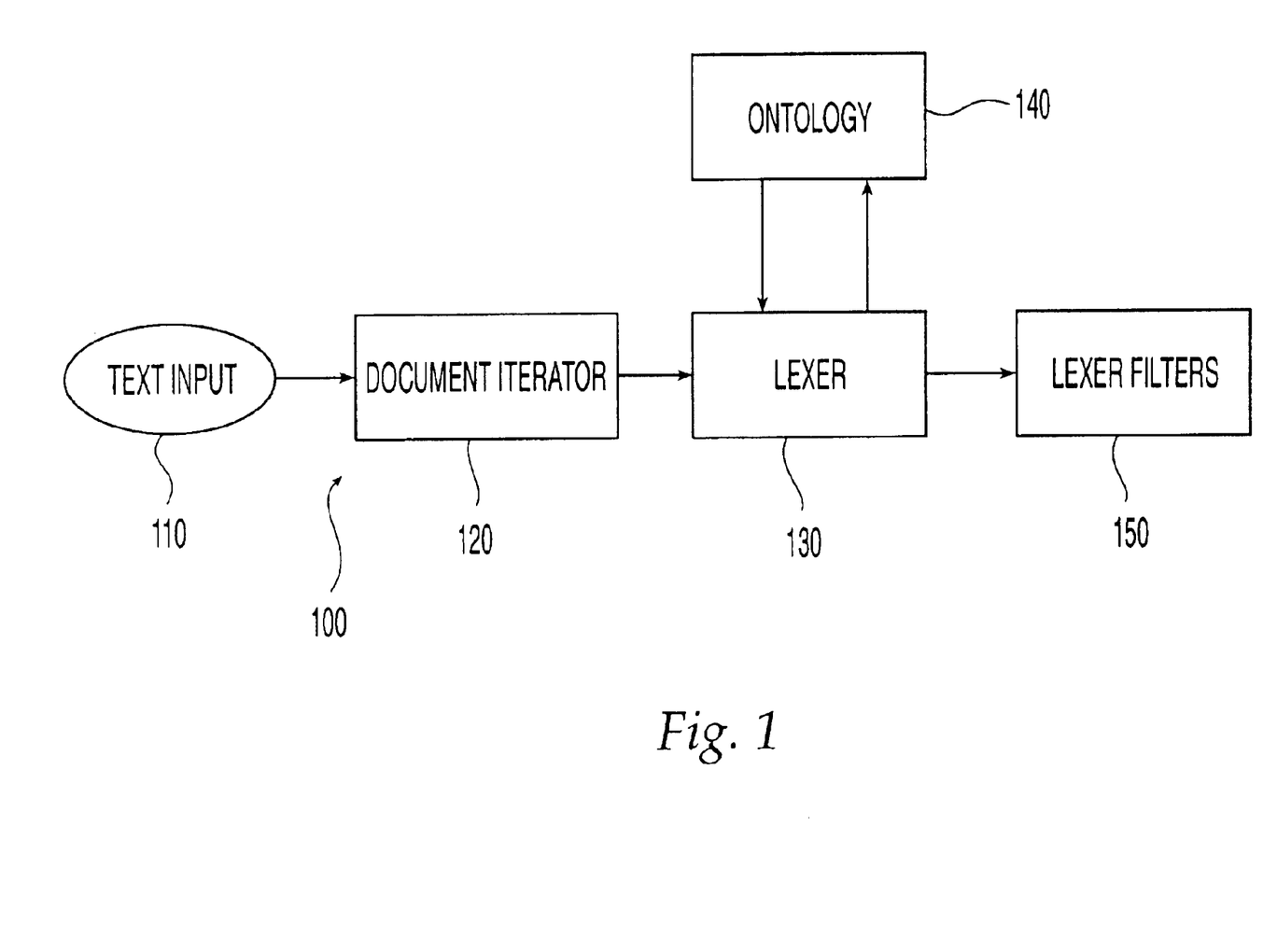
FIG. 1 is a block diagram of the sentence lexer according to the present invention.
Figure 2:
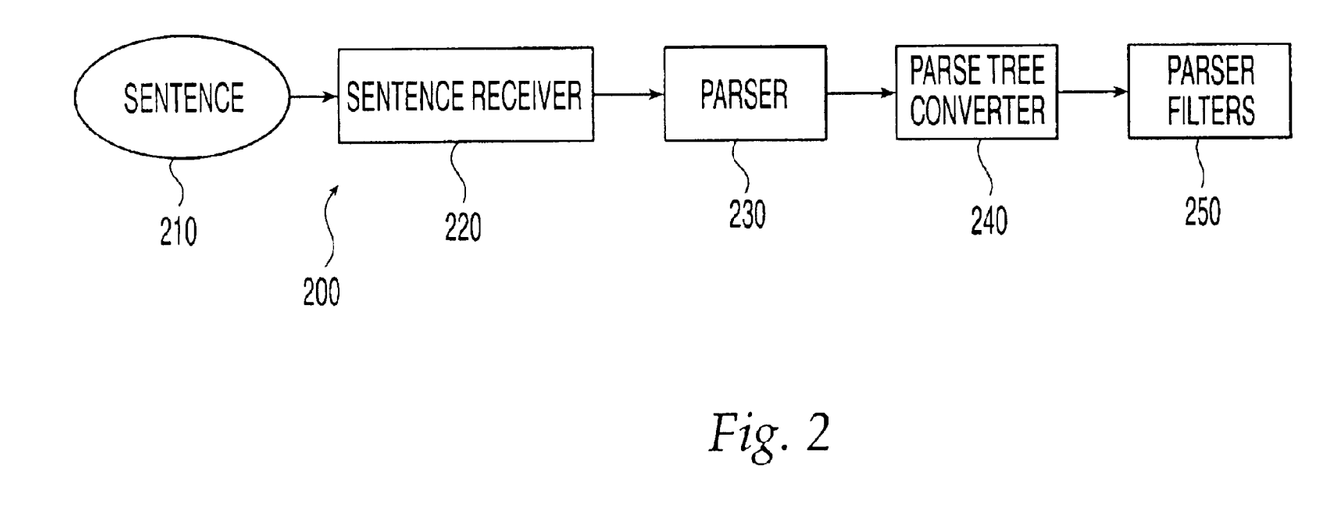
FIG. 2 is a block diagram of the parser according to the present invention.

As stated previously, the ontological parser has two major components, a sentence lexer 100 and a parser 200. The sentence lexer 100 is a tool for transforming text strings into ontological entities. The parser is a tool for analyzing syntactic relationships between entities.

Referring to FIG. 1, the sentence lexer 100 is shown. Document iterator 120 receives documents or text input 110, and outputs individual sentences to the lexer 130. As the lexer 130 receives each sentence, it passes each individual word to the ontology 140. If the word exists within the ontology 140, it is returned as an ontological entity; if not, it is returned as a word tagged with default assumptions about its ontological status. In one embodiment, words are automatically assumed to be nouns; however, the words may be other parts of speech.

After the lexer 130 has checked the last word in a sentence against the contents of the ontology 140, the unparsed sentence is passed to a series of lexer filters 150. Lexer filters 150 are modular plug-ins, which modify sentences based on knowledge about word meanings. The preferred embodiment contains several filters 150, although more may be developed, and existing filters may be removed from future versions, without altering the scope of the invention. For example, in an information retrieval application, an ontological parser may employ the following filters: proper noun filter, adjective filter, adverb filter, modal verb filter, and stop word filter. Similarly, for information retrieval purposes, an embodiment of the ontological parser optimized for queries may make use of all these filters, but add a pseudo-predicate filter and a pseudo-concept filter.

The stop word filter removes stop words from sentences. Stop words are words that serve only as placeholders in English-language sentences. The stop word filter will contain a set of words accepted as stop words; any lexeme whose text is in that set is considered to be a stop word.

An adjective filter serves to remove lexemes representing adjective concepts from sentences. Adjective filter checks each adjective for a noun following the adjective. The noun must follow either immediately after the adjective, or have only adjective and conjunction words appearing between the noun and the adjective. If no such noun or conjunction is found, the adjective filter will veto the sentence. The noun must also meet the selectional restrictions required by the adjective; if not, the adjective filter will veto the sentence. If a noun is found and it satisfies the restrictions of the adjective, the adjective filter will apply the selectional features of the adjective to the noun by adding all of the adjective's selectional features to the noun's set of selectional features.

The proper noun filter groups proper nouns in a sentence into single lexical nouns, rather than allowing them to pass as multiple-word sequences, which may be unparsable. A proper noun is any word or phrase representing a non-generic noun concept. Although a number of proper nouns are already present in the lexicon, they are already properly treated as regular lexical items. Since proper nouns behave syntactically as regular nouns, there is no need to distinguish proper nouns and nouns already in the lexicon. The purpose of the proper noun filter is to ensure that sequences not already in the lexicon are treated as single words where appropriate.

The modal verb filter removes modal verbs from sentence objects. Modal verbs are verbs such as "should", "could", and "would". Such verbs alter the conditions under which a sentence is true, but do not affect the basic meaning of the sentence. Since truth conditions do not need to be addressed by the ontological parser 120 or 140, such words can be eliminated to reduce parsing complexity. The modal verb filter will contain a set of modal verbs similar to the stop filter word list contained in stop word filter. Any Lexeme whose text is in that set and whose concept is a verb is identified as a modal verb, and will be removed.

The adverb filter removes Lexemes containing adverb concepts from sentences. Adverbs detail the meaning of the verbs they accompany, but do not change them. Since the meaning of the sentence remains the same, adverbs can be removed to simplify parsing.

The pseudo-predicate filter operates in one embodiment, as a query ontological parser. It removes verbs from queries which are not likely to be the actual predicate of the query. Pseudo-predicate verbs include "give", "show", and "find". Not all instances of these verbs are pseudo-predicates; however, the first instance of them in a query often is. In one embodiment, the deterministic rule to be used in implementing the pseudo-predicate filter is that it should remove any instance of these verbs not preceded by a content-bearing noun (i.e., one not appearing in the list of pseudo-concepts or stop words).

The pseudo-concept filter operates in one embodiment, a query ontological parser. It removes concepts from queries, which are not likely to be the actual concept the user intends. Pseudo-concepts are largely nouns, and can be captured by a stop word list. Pseudo-concepts include "I", "me", "you", and in certain syntactic usages, "information", "news", and related words. Two rules are included in this example of a pseudo-concept filter implementation. The first rule is that any word relating to the user, or his current situation, such as "I" or "me" is always deleted. The second rule is that any of the "information"-type words is deleted when followed by a preposition.

The configuration of the parser 200 is shown in FIG. 2. First, the sentence receiver 220 obtains sentences 210 consisting of ontological entities produced by the sentence lexer 100. These sentences are parsed by the parser 230, which is designed to use a context-free grammar, although other grammatical models may be used without departing from the scope and spirit of the invention. Sentences are parsed into structures called parse trees, which represent the relationships between concepts in a sentence. Parse tree converter 240 receives the output of the parser 230, and converts the parse trees into predicates. Following the Parse tree converter, parser filters 250 operate or the predicates to remove erroneously generated predicates based on rules about the probability of syntactic analyses, as well as rules about the compatibility of concepts with each other.

The sentence receiver 220 is an architectural feature designed to provide an interface between the sentence lexer 100 and the ontological parser 200. The sentence receiver is a software abstraction that may be realized through any number of techniques.

The parser 230 takes a sequence of instances from an ontology, in the form of a sentence, and converts them into a collection of parse trees. Preferably, the parser 230 will use a modified version of an LALR parser, which looks ahead (by one word), scans the input from left-to-right, and constructs a parse tree from the bottom up. The LALR parser is widely used and is better known as the approach used by parser generators such as yacc and bison. While the description is a preferred embodiment, it will be understood that any implementation of a context-free grammar within a similar architecture, including such variants as an LALR-2 parser (which looks ahead by two words), are within the scope of the present invention.

LALR parsers and parser generators are incapable of handling ambiguous grammars, as well as some grammars that are not ambiguous but do not follow the prescribed LALR format. Consequently, a parser that handles both of these conditions is needed. The parser 230 must pursue all possible parse trees, in effect branching and pursuing more than one path at every ambiguity.

The standard LALR parser is a finite state machine designed to build a parse tree from the set of grammar rules (called productions) one input symbol at a time. The finite state machine makes use of a two-dimensional table, called an action table, that specifies what action the finite state machine is to perform when the state machine is in a given current state and the next symbol in the input stream is a given symbol. At every cycle, a new character is read from the input stream and the character and current state are used to look up, in the action table, which action to perform. The actions are in one of the following forms:

Shift actions cause the parser to enter a new state and indicate that some progress has been made in assembling the production currently in progress;

Reduce actions cause the parser to finish the current production and replace the assembled symbols with the symbol that replaces them;

Accepts cause the parser to finish assembling a complete parse tree and halt;

Errors cause the parser to give up because no grammar rule is available to reconcile what has already been parsed with what remains in the input stream.

LALR parsers can be generated by a standard algorithm that builds the parser finite state machine's action table from a set of grammar rules. These grammar rules, called productions, specify language that the target parser is supposed to recognize. Each production indicates that a specific combination of input symbols, called terminals, and assembled groups of terminals, called non-terminals, can be assembled into a new non-terminal. For example, the grammar, set of productions, set forth below recognizes a string of at least one 'a':

S □S a

S □a

The standard LALR parser generator algorithm fails when the grammar does not provide the parser generator enough information to decide whether the correction to perform given a certain current state and input symbol is to shift or to reduce. The generator algorithm also fails when the grammar does not provide the parser generator enough information to decide which of two or more rules should be reduced. For instance, consider the following grammar:

S □AB

S □ab

A □a

B □b

Given this grammar, an LALR parser generator would fail to produce a parser because of a shift/reduce conflict. The parser generator would be unable to decide whether after having seen 'a' as input and having looked ahead to see the coming 'b' it should continue to work on assembling the production S □ab (shift action) or reduce the rule A □a (reduce action). The modified LALR parser generator algorithm that the ontological parser of the present invention uses must be aware of the possibility of more than one possible course of action, and should recursively try both actions.

Figure 3:
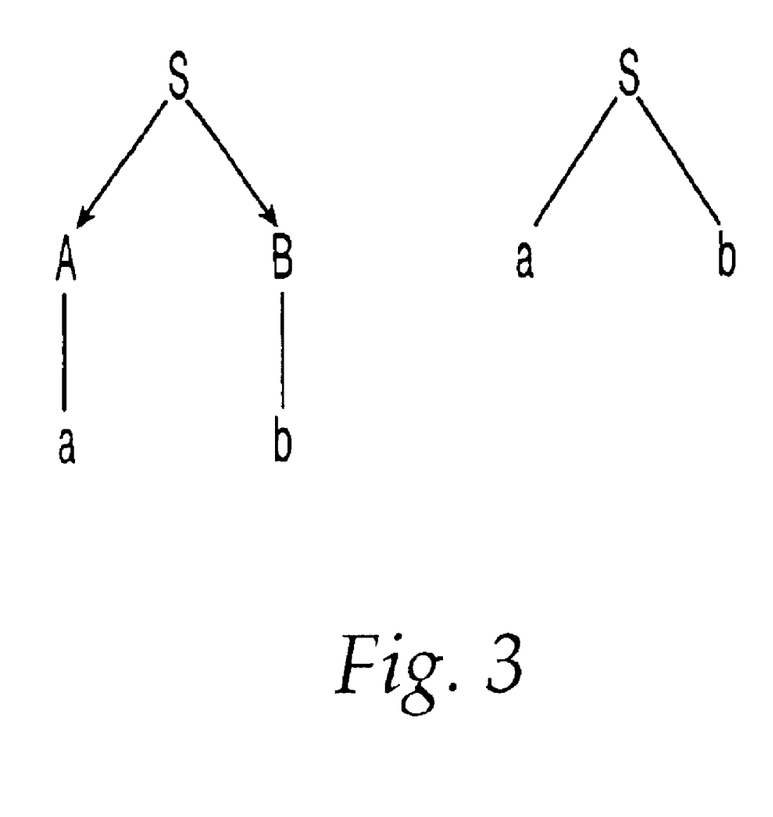
FIG. 3 is a diagram showing two complete parse trees produced according to the present invention.

Using the modified LALR parsing approach, a parser built to recognize the ambiguous grammar above would produce both of the complete parse trees shown in FIG. 3, for the input string 'ab.'

An example of a context-free grammar that would be used in implementing the parser is as follows:

| | |
|---|---|
| S→NP VP | |
| VP→V | NP→N |
| VP→V NP | NP→N PP |
| VP→VP CONJ NP | NP→Adj N |
| VP→V NP CONJ NP | NP→Adj Adj N |
| VP→V NP PP | NP→Adj N PP |
| VP→V NP VP | NP→Adj Adj N PP |
| VP→V that S | NP→NP CONJ NP |
| PP→P NP | |
| PP→P CONJ NP | |
| COMMA→CONJ | |

The modified LALR parser generator, grammar, and modified LALR parsing engine discussed previously should generate a non-deterministic recursive parser. Since a natural language is the input to the grammar, some sentences will fail to meet the foregoing conditions. In other cases, syntactic ambiguity will result in multiple possible parses. The parser should not generate any output trees for a sentence that does not reduce according to the rules; rather it should generate a tree for every possible parse of an ambiguous sentence. In the above example, NP represents a nominal phrase, VP represents a verbal phrase, and CONJ represents a conjunction.

Since the parser is both probabilistic and operating on multiple streams of possible ontological entities, it is necessary to prune out spurious parse trees generated by the parser 230. Parser filters 250 are designed to prune out spurious parse trees generated by the parser 230, by removing trees that violate either statistical or ontological criteria for well-formed-ness. While several types of parser filter are set forth above, other filters may be included, such as a selectional restriction filter and a parse probability filter.

Similar to the lexer filters 150, the parser filters 250 may be chained together to form a list of filters to be applied to each candidate parse tree. Each parser filter 250 will keep track of the filter that should be applied immediately before it, and will submit candidate parse trees to that filter before performing a filtering function. Since each parse filter 250 may alter or veto each candidate parse tree, each parse filter 250 must expect this possible behavior from the previous filter in a chain.

A selectional restriction filter vetoes any parse tree where there are conflicts between the selectional features of the concepts serving as arguments to another concept and the restrictions of that concept. Selectional restrictions are imposed on the argument positions of predicate structures. The filter checks the selectional features of the concepts, which could fill the argument slots, to see if they are compatible. This operation may be accomplished in several ways:

If the ontology used by the parser only contains string labels for the nodes in a tree structure, the tree leading to the restriction must be established as a sub-tree of the selectional features of the argument. They must share the same hierarchy of features up to the point of the restriction. Consider a sample path through an ontology:

transportation→vehicle→car→Ford.

In this example, if the argument position of a predicate must be an example of transportation, then any of the three more-specific words will be an acceptable argument for the predicate. However, it will take multiple iterations through the hierarchy to discover this fact. For example, if the word that actually occurs in a sentence is "Ford," the filter will first determine that Ford is an example of a car, and then that car is an example of a vehicle, and only after three attempts will it find that Ford is a word which agrees with the selectional restriction of "transportation." Similarly, the filter would need to check twice to determine that "car" is in agreement with "transportation," and once for "vehicle."

In contrast, a parameterized ontology assigns numbers to these concepts, such that each level is a larger number than the previous level. Suppose we assign to the same sequence of concepts the set of numbers:

1000→1100→1110→1111.

We can then subtract numbers to see if the features are in agreement, and a non-negative result suffices to prove this. Thus, if we want to see if "Ford" is an example of "transportation," we subtract as follows:

1111−1110=1.

Since 1 is nonnegative, we know that the features are in agreement. If concepts are identical, they will subtract to zero, which is equivalent to passing the filter by having two identical strings.

As a final example, if an argument had to be an instance of "vehicle," and the word actually used in the sentence was "transportation," then the selectional restriction filter would calculate:

1000−1100=−100.

This result is negative, so the parse would be rejected because of feature incompatibility.

The parse probability filter vetoes parse trees that fall below a minimum probability for valid semantic interpretation. The parse probability filter will calculate the probability of a sentence parse by taking the product of the probabilities of the syntactic rules used to generate a given parse tree. Certain rules are more probable than others. However, appropriate probabilities for each rule can only be determined by experimentation. In the initial version, probabilities will be assigned by linguistic intuition; as iterations of the design progress, probabilities will be determined through experimentation. Since sentence probabilities are generally very small numbers, the parse probability filter should pass any parse tree with a probability of at least 30% of the highest probability parse.

Parse trees may be useful in some applications, and thus an interface is provided to output parse trees directly. However, the intended output of the parser is the set of predicate structures that it builds for each sentence, and so the preferred parse tree receiver is a software module called a parse tree converter, which extracts predicate structures from the parse trees. The predicate structures may be used by any application, which incorporates the present invention.

The modular design of the ontological parser permits the use of any part-of-speech-tagged ontology, with only minimal rewriting of the lexer and parser to accommodate format-specific issues. However, maximum benefits are recognized through the use of a parameterized ontology, an innovation heretofore unavailable in any parser or information retrieval system.

Ontologies are hierarchies of related concepts, traditionally represented by tree structures. These trees are implemented via a variety of techniques, which are generally equivalent to doubly-linked lists. A doubly-linked list is a collection of data objects containing at least three significant members: a pointer to the previous node in the list, a pointer to the following node in the list, and the data itself, which may take any form, depending on the purpose of the list. Doubly-linked lists must be created with head and tail nodes, which terminate the list and are designed to keep traversals of the list in bounds. That is, the pointer to the node previous to the head contains the address of the head, and the pointer to the node after the tail contains the address of the tail. This structure guarantees that an arbitrary number of nodes may be inserted into the list without losing track of the locations of existing nodes, as well as enabling the list to be searched from either the top or bottom.

However, the great flexibility of tree data structures, which may encompass trees of arbitrary depth, also imposes a significant cost in computability. The utility of ontologies derives from their use as a reference tree structure encompassing all relationships between all concepts within the information domain they are created for. Knowledge bases contain instances of real data, which represent a location somewhere within the ontology. Validating the equivalence of an instance with a concept in an ontology entails comparing the features of an instance with the features of a concept. Since algorithms to compare these features must be general enough to cover the potentially arbitrary number of levels from the root of the ontology to the feature in question, they cannot be optimized to compare such trees in a single operation. Instead, they must traverse the list of links and compare structures on a node-by-node basis to guarantee identity. Complicating this procedure is the fact that concepts may be cross-linked across multiple branches of a tree, sharing multiple structures. This entails even more general-purpose algorithms for logic programming, as several branches of a tree need to be followed. The result is that the time complexity of structure-comparison algorithms attains the polynomial order of the number of features (or nodes) being compared. This fact makes the use of ontologies inefficient for high-performance computing applications, such as searching terabyte-sized databases with wide-ranging conceptual content.

A crucial assumption may be used to define the problem so that algorithms can be designed much more efficiently to compare structures. This assumption is that the number of branches in an ontological hierarchy, and their depth, can be determined by designing it to fixed parameters at the time of creation, and by selecting maximum values for the branches and the depths. When the ontology is applied to natural-language processing applications, such as indexing web pages for a search engine, it will only be able to assign feature structures to those words, which are instances of concepts already in the ontology. Crucially, a limitation of this assumption is that substantially more effort must be applied in crafting the ontology, since re-indexing large volumes of text becomes extraordinarily expensive as the text grows. The designers of a parameterized ontology must be certain that their coverage is adequate before making a decision to freeze the structure.

This is different than the concept that a parameterized ontology is not extensible, however. A key to intelligent design is leaving room for expansion. As long as the maximum depth of trees is not reached, adding additional levels is transparent. The trade-off in a parameterized ontology is selecting the size of a data structure so that it is no larger than it needs to be, but with adequate room for correcting mistakes or expanding coverage later on. It is possible to mitigate the risk entailed in reengineering a parameterized ontology by mapping the old structure to a new one, and simply writing a translation routine to recode existing data into the new form.

Since algorithm design and implementation are distinct and separable issues, an embodiment of a parameterized ontology's data structures has not yet been discussed. The following is a suggested implementation.

The proposed data structure includes an integer value, where each digit of the integer corresponds to a specific branch taken at the corresponding level in the tree. The parameterization is thus encoded in two ways: the base (i.e., decimal, octal, etc.) of the integer bounds the number of branches extending from the root node(s) of the ontology, while the number of digits in the integer bounds the potential depths of the tree. For example, if an array with 10 elements, all of which were base-10 integers, was defined to be the representation of an ontology, a maximum of $10^{10}$(10 billion) distinct concepts could be defined.

The above data structure naturally lends itself to one particular algorithm for comparing the identity or subsumption of ontological features. The algorithm relies on the implementation of the tree by associating with each node in the tree an integer value that represents the position of that node within the hierarchical structure. Consider, for example, the tree illustrated in FIG. 4.

Figure 4:
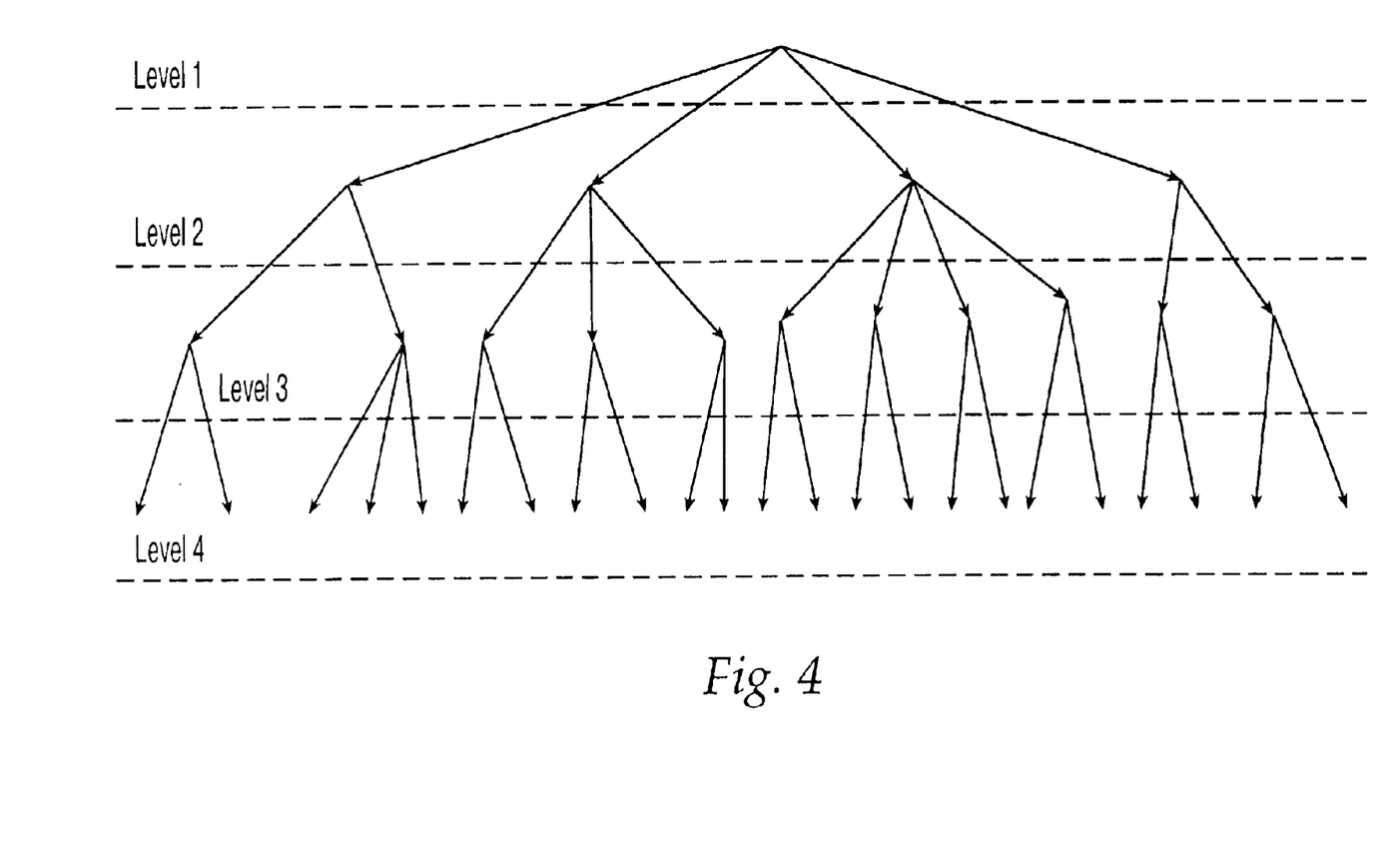
FIG. 4 is an example parse tree according to the present invention.

Each arrowhead in FIG. 4 represents a concept node. The deeper into the tree (i.e., the higher the numbered level of the concept node), the more specific the concept is. Consider one path through FIG. 4. The path starts at the root node (Level 1) and takes the 2nd branch to level 2, then takes the 3rd branch from that node to get to level 3. Thus, an appropriate (decimal) representation of this node might be "1230" (where all horizontal branch choices are counted from left to right, the root node is the highest significant digit of the representation, and counting the root node as node #1 of level 1.) The final "0" is a terminator, indicating that this particular node of the tree is not at the lowest possible level of the tree; it does not necessarily indicate that no nodes branch from this level. In fact, this is clearly not the case in this example.

Such a representation scheme gives each node in the tree a unique identifier that completely determines the relative place of that node in the tree structure. It also provides a simple way to compare relative positions of two discovered node instances. This is as simple as subtracting the value of one node identifier from the other. For example, in a search engine application, it may be useful to check whether or not a particular noun can serve as an argument of a predicate. The features of the noun should be more specific than the features of the argument position it is attached to. This means that the noun should be deeper in the tree than the argument node. Similar features will have similar paths through the tree.

Figure 5:
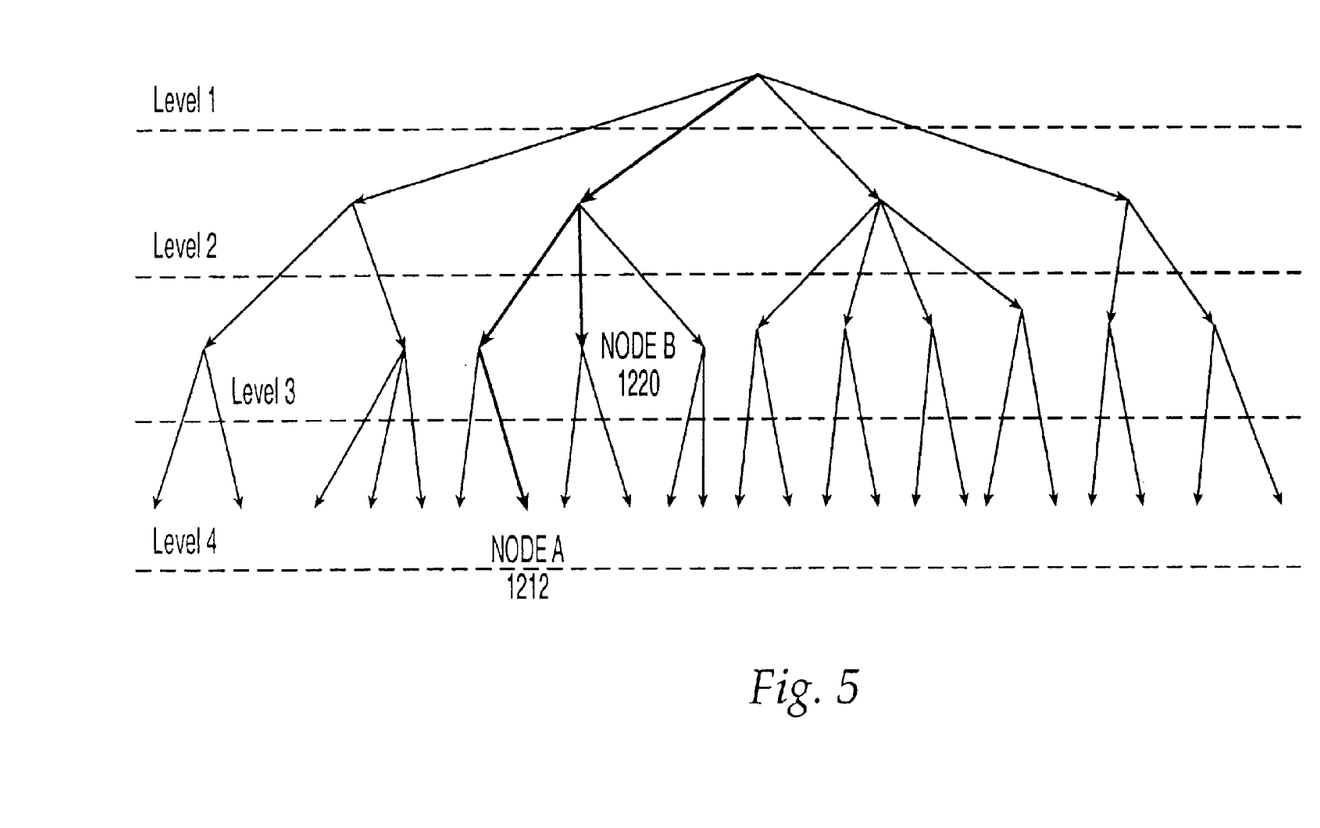
FIG. 5 is another example parse tree according to the present invention.

Referring to FIG. 5, an example is illustrated. Node A is represented with the decimal number "1212." Node B is represented with the decimal number "1220." The difference between Node A and Node B, taken digit-by-digit from left to right is "001-." It is worth noting that once the first digit difference is detected, there is no further need to compute remaining digits. They diverge at level 3, the third digit in the representation, and thereafter lie along completely different sub-trees that do not intersect. Any further differences are thus meaningless and irrelevant.

If the ontological tree structure is carefully crafted, proximity within the tree should, in some measure, correspond to ontological proximity. Therefore, detecting the first digit difference, as above, gives a reasonable measure of the degree of ontological proximity of the two concepts. The closer the concepts are, the smaller the numerical value of the divergence. Thus, for example, the node to Node A's immediate left, is represented by "1211." When the difference comparison is made, it works out to be "0001," which implies a correspondingly close ontological relationship between the two concepts.

At this point, it is useful to consider how real words map into this sort of coding, and what its limitations are. For example, consider a tree shown in FIG. 7.

Figure 7:
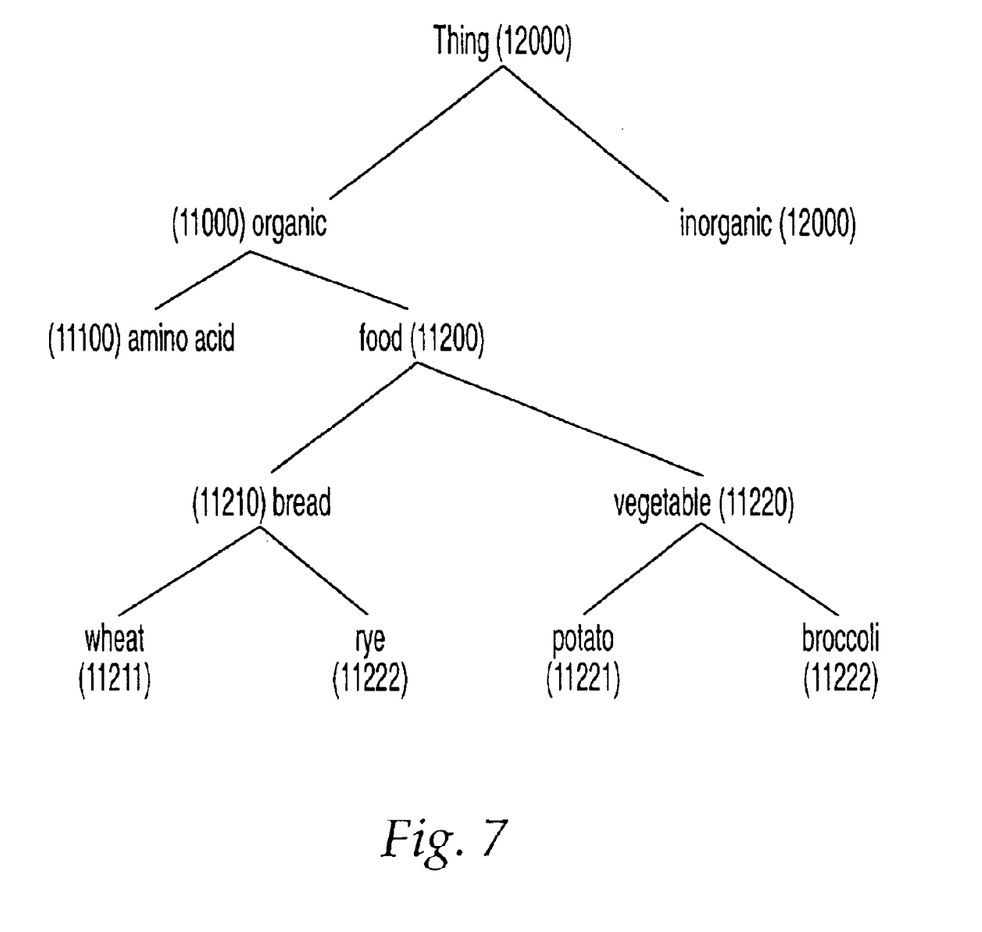
FIG. 7 is another example parse tree incorporating real words according to the present invention.

It is clear that in some cases, it is useful to know the distance between words, but that it is not equally useful in all cases. For example, since "bread" and "broccoli" are nodes which directly inherit all the properties of "food," it is useful to know that one of these words is more specified than the other in cases where we want to search for only foods of certain types. However, since neither of these terms shares any properties beyond "organic" with "amino acid," it is not helpful to know the distance between "bread" and "amino acid," even though they are only one level apart.

This makes the utility of the numerical encoding scheme as a parsing tool clearer. During the sentence lexer stage, words are labeled with information from the ontology, including these numerical codes. The argument position for each predicate structure may be tagged with codes from any level of the ontology. The parser will only output predicate structures where the noun inherits at least those features specified by the code. For example, the object of the verb "eat" is usually a type of food. A predicate structure built from "eat" might thus require that the object of the predicate have a code beginning with "112." As can be seen from the tree shown, it is clear that all the foods listed inherit the "112" prefix.

The sign of the difference between tree entries is irrelevant. The difference is simply a digit-by-digit comparison that starts with the most significant bit and continues until the first decimal digit difference is located. Importantly, though, the differences due to inheritance along incompatible sub-trees do not correspond to elements of natural-language meaning. Thus, to use the example above, even though "amino acid" and "food" differ by the same order of magnitude from "organic," they are not synonymous, and applications making use of this coding must be aware of this fact.

A side benefit from this algorithm is that it provides an intuitive, natural ranking algorithm. Larger values from the subtraction operation mean further distance apart in the tree, so even when two concepts are in the same branch, the representation provides a convenient metric of conceptual distance. The results from the feature-comparison operation could be used in a ranking algorithm so that smaller differences receive higher relevance rankings. However, it is clear from the tree above that not all differences are equally meaningful. In order for the magnitude of the difference to be relevant, it must first be the case that one of the concepts inherits all the properties of the others.

As described above, the use of decimal digits for each level of the tree has an inherent weakness in such a representation scheme. A 10-digit decimal number allows $10^{10}$, or 10 billion possible concepts to be stored in the tree. That is a sufficient number of total concepts, but the branching factor is too small. There can be a maximum of ten possible branches out of each node to the next level. As an example of the problem inherent in this limit, consider the concept "move." Clearly there are many more than ten general ways (i.e., branches to the next level) in which to move, such as: walk, run, drive, sail, ride, fly, hop, swim, crawl, dance, slide, skid, roll, etc. As a more specialized example, consider a warfare ontology. The concept of "weapon" could include such varied concepts as tank rifle, cannon, machine gun, chemical gas, viral agent, germ agent, bomber, fighter plane, pistol, bomb, incendiary device, nuclear weapon, missile, bazooka, and so on. Consequently, ten is too small to constrain the branching factor for each level. The use of a hexadecimal representation would improve this some by increasing the branching factor to 16. Thus, using a 16-digit (i.e., a 64-bit) hexadecimal number gives 16 branches at each node for 16 levels: $16^{16}$ possible concepts. In addition to eliminating the need to do binary-to-decimal conversions, such a hexadecimal representation stores more concepts than any reasonable ontology will ever need. Despite such an improvement over a decimal representation, the branching factor of only 16 is still unacceptably small.

A solution to this is to use a modified hexadecimal representation. Since it is unlikely that a reasonable, specialized ontology will need more than eight levels of general concept representation, a 16-digit hexadecimal number can be interpreted slightly differently, as an octet of hexadecimal pairs:

52C2 6296 AC19 0000->52 C2 62 96 AC 19 00 00

Such a representation provides eight total ontological levels, and gives a branching factor at each node of 162, or 256. This representation also provides optimized execution of the difference comparison, since using hexadecimals instead of decimals optimizes the logical digit-by-digit comparison to a computer-efficient byte-by-byte comparison.

It should also be noted that the above examples of decimal, hexadecimal, or multi-digit hexadecimal are typical parameter choices for the node encoding included in the present invention. The specific parameters chosen do not alter the conception of the invention, which is the numerically encoded ontology tree.

For example, another possible encoding of the ontology tree might involve a 40-digit decimal number. In such a case, 4 digits could be assigned to each node of the tree, implying that the tree could have up to 10 levels of depth. Such an encoding would allow $10^4-1$ or 9,999 branches on each level, and a tree depth of 10. Similarly, a 36-digit hexadecimal encoding that assigns 3 digits to each node allows a branching factor at each node of 4095 (i.e., $16^3-1$) and a total depth of 12 levels.

One other factor that should be considered is whether these node representation values should be computed on the fly as the tree is traversed or whether they should be stored at each node. It would certainly be possible to compute these dynamically, since any tree-search algorithm must keep track of which branches it traverses in trying to locate a particular node. However, as the search backtracks and corrects its path a fair number of adjustments and recalculations of the current node value would likely result.

The trade-off is to store at each node the relative position of the node in the tree via the 16-digit hexadecimal number. This would add 8 bytes of total storage to each node in the tree. For a 10,000-concept tree, this is only 80 KB. For a 100,000-concept tree, it is 800 KB. And for a 1,000,000-concept tree, it is 8 MB. Regardless of whether the values are maintained statically or dynamically, it is clear that both implementation details fall within the spirit and scope of the invention.

It should be readily apparent that the ordering of elements of the code can be arbitrary, but must be used consistently in order to compare features. There are two ways to construct a parameterized ontology. The first method is to simply freeze an existing ontology, write a program to find the maximum tree depths and number of branches, and then write another program to recode the pointer information into array elements and depths. This method allows rapid bootstrapping of existing ontologies to higher levels of performance, although it will preserve any redundancies and inefficiencies in the original construction.

The second method is to perform research from the ground up in defining an ontology, assigning elements on an as-needed basis. Since minimal representation size is a main goal of parameterizing the ontology, one would want to eliminate many of the redundancies found in general-purpose ontologies such as WordNet. For example, WordNet provides a concept for "run" which is derived from "move," and another concept for "run" which is derived from "leave/go away," where the two parent concepts are in no way linked. This distinction may have some psychological validity, but it is not computationally attractive to maintain this distinction in separate array elements.

A compromise approach is to attempt to make judgments about redundancy, and write software to merge branches as specified by the judgments of a knowledge engineer. This requires the creation of a table of equivalent branches and tree depths, and requires substantial knowledge engineering time, but not as much as attempting to create an ontology from the ground up.

The following is an example of a sentence and demonstrates both how it is parsed as a sentence within a document, and how a question to an information retrieval system would produce matching predicates to retrieve the document containing this sentence. The example is explained with regard to how the sentence would be parsed as a declarative, and in a sample search engine application, how a query matching the sentence parse would also be generated. The example sentence is:

The octopus has a heart.

First, the sentence lexer 100 would process this sentence. The first component of the sentence lexer 100, the document iterator 110, would extract this sentence from the document it was contained in. At this stage, it would exist as the text string shown above. Following that, it would be passed to the lexer 120, which would access the ontology 140, and return the sequence:

The-det octopus-noun have-verb a-det heart-noun.

Here, det stands for determiner, which is a word with a purely grammatical function, namely specifying a noun phrase. The other tags, noun and verb, indicate parts of speech with ontological content. Thus, when the sentence passes through the lexer filters 150 as discussed in the previous example embodiment, the stop word filter removes "a" and "the," leaving:

octopus-noun have-verb heart-noun

Figure 6:
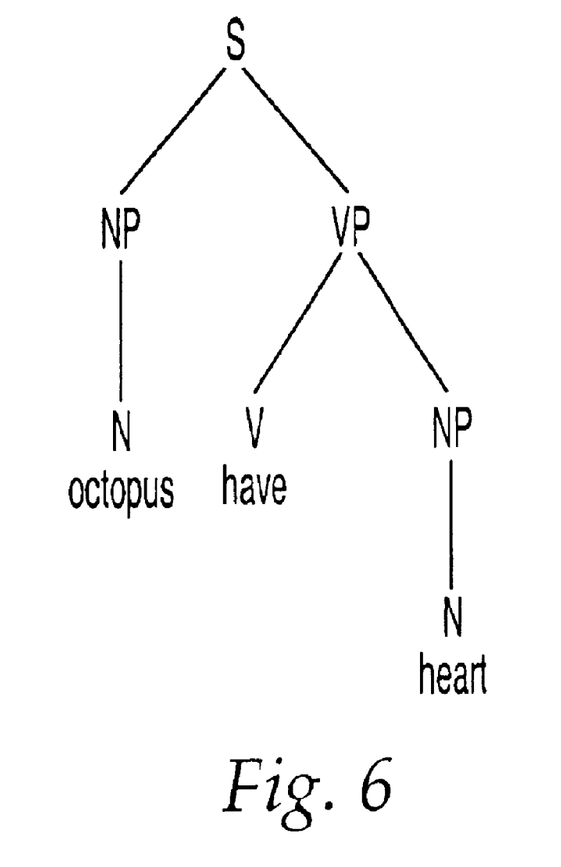
FIG. 6 is another example parse tree according to the present invention.

The sentence is then taken up by the sentence receiver 210, which passes it to the parser 220. In the parser 220, the tree shown in FIG. 6 is produced. The parse tree converter 230 then converts this tree into a predicate, where octopus is the subject of have, and heart is the object. The predicate is:

have<octopus, hearts>

In this sample embodiment, this predicate is then passed through the parser filters, where it successfully passes the parse probability and selectional feature compatibility tests. In the foregoing example, "have" is a verb unlikely to have any selectional restrictions on arguments. Following filtering, the predicate can be used within any application which benefits from the ability to manipulate natural language. Suppose that a user of a search engine which makes use of this parser asks the question:

Do octopuses have hearts?

The sentence lexer 100 will read the question, and a sentence made of ontological entities is produced. It reads:

Do-verb octopus-noun have-verb heart-noun

In the preferred embodiment's lexer filters, the pseudo predicate filter removes the first verb "do," because it is not the main verb of the sentence. "Do" only serves to fill a grammatical role within this type of question, and is thus removed, leaving:

octopus-noun have-verb heart-noun

This is identical to the sentence produced above, and results in the same parse tree, and the same predicate structure. Thus, when the ontological parser in this example embodiment receives this question, it generates a predicate identical to that from a declarative sentence, and they can be matched. In this way, the parser enables information retrieval using natural language.

Having described several embodiments of the concept-based indexing and search system in accordance with the present invention, it is believed that other modifications, variations and changes will be suggested to those skilled in the art in view of the description set forth above. It is therefore to be understood that all such variations, modifications and changes are believed to fall within the scope of the invention as defined in the appended claims.

What is claimed is:

1. A system for ontological parsing that converts natural-language text into predicate-argument format comprising:
   a sentence lexer for converting a natural language sentence into a sequence of ontological entities that are tagged with part-of-speech information; and
   a parser for converting the sequence of ontological entities into predicate structures using a two-stage process that analyzes the grammatical structure of the natural language sentence and binds arguments into predicates.

2. A system for ontological parsing that converts natural-language text into predicate-argument format as recited in claim 1, wherein said sentence lexer comprises:
   a document iterator that receives text input and outputs individual sentences;
   a lexer that receives said individual sentences from said document iterator and outputs individual words; and
   an ontology that receives said individual words from said lexer and returns ontological entities or words tagged with default assumptions about an ontological status of said individual words to said lexer.

3. A system for ontological parsing that converts natural-language text into predicate-argument format as recited in claim 2, wherein said ontology is a parameterized ontology that assigns numbers to concepts.

4. A system for ontological parsing that converts natural-language text into predicate-argument format as recited in claim 3, wherein said numbers can be subtracted to determine if features are in agreement, wherein a non-negative number indicates agreement.

5. A system for ontological parsing that converts natural-language text into predicate-argument format as recited in claim 3, wherein said numbers can be subtracted to determine if features are in agreement, wherein a negative number indicates feature incompatibility.

6. A system for ontological parsing that converts natural-language text into predicate-argument format as recited in claim 3, wherein in said parameterized ontology, each data structure includes at least one integer value, where groups of digits of said integer value correspond to specific branches taken at corresponding levels in a parse tree.

7. A system for ontological parsing that converts natural-language text into predicate-argument format as recited in claim 6, wherein said parameterized ontology is encoded in two ways: a base of said integer value bounds a number of branches extending from a root node of said ontology, while a number of digits in the integer value bounds a potential depths of said parse tree.

8. A system for ontological parsing that converts natural-language text into predicate-argument format as recited in claim 6, wherein a first digit difference between two nodes provides a measure of the degree of ontological proximity of two concepts.

9. A system for ontological parsing that converts natural-language text into predicate-argument format as recited in claim 6, wherein said predicates and arguments are represented by encodings comprising at least one digit separated into multiple groups to provide multiple ontological levels and a branching factor at each node.

10. A system for ontological parsing that converts natural-language text into predicate-argument format as recited in claim 2, further comprising lexer filters for modifying said individual sentences based on word meanings.

11. A system for ontological parsing that converts natural-language text into predicate-argument format as recited in claim 10, wherein said lexer filters comprise at least one of: a noun filter, an adjective filter, an adverb filter, a modal verb filter, a stop word filter, a pseudo-predicate filter, and a pseudo-concept filter.

12. A system for ontological parsing that converts natural-language text into predicate-argument format as recited in claim 11, wherein said stop word filter removes stop words from said individual sentences.

13. A system for ontological parsing that converts natural-language text into predicate-argument format as recited in claim 11, wherein said adjective filter removes lexemes representing adjectives from said individual sentences.

14. A system for ontological parsing that converts natural-language text into predicate-argument format as recited in claim 11, wherein said noun filter groups proper nouns into single lexical nouns.

15. A system for ontological parsing that converts natural-language text into predicate-argument format as recited in claim 11, wherein said modal verb filter removes modal verbs from objects of said individual sentences.

16. A system for ontological parsing that converts natural-language text into predicate-argument format as recited in claim 11, wherein said adverb filter removes lexemes containing adverb concepts from said individual sentences.

17. A system for ontological parsing that converts natural-language text into predicate-argument format as recited in claim 11, wherein said pseudo-predicate filter removes verbs from queries.

18. A system for ontological parsing that converts natural-language text into predicate-argument format as recited in claim 11, wherein said pseudo-concept filter removes concepts from queries.

19. A system for ontological parsing that converts natural-language text into predicate-argument format as recited in claim 1, wherein said parser comprises:
   a sentence receiver that receives sentences including ontological entities from said sentence lexer;
   a parser component that parses said sentences, received by said sentence receiver, into parse trees representing concepts in a respective sentence received by said sentence receiver; and a parse tree converter that receives the output of said parser component and converts said parse trees into predicates.

20. A system for ontological parsing that converts natural-language text into predicate-argument format as recited in claim 19, wherein said parser component further comprises:

parser filters operating on said predicates to remove erroneous predicates.

21. A system for ontological parsing that converts natural-language text into predicate-argument format as recited in claim 19, wherein said parser component looks ahead at least one word, scans input from left-to-right, and constructs said parse tree.

22. A system for ontological parsing that converts natural-language text into predicate-argument format as recited in claim 20, wherein said parser filters remove parse trees that violate one of statistical and ontological criteria for well-formedness.

23. A system for ontological parsing that converts natural-language text into predicate-argument format as recited in claim 22, wherein said parser filters include a selectional restriction filter and a parse probability filter.

24. A system for ontological parsing that converts natural-language text into predicate-argument format as recited in claim 23, wherein said selectional restriction filter vetoes parse trees having conflicts between selectional features of concepts serving as arguments to a second concept and restrictions of said second concept.

25. A system for ontological parsing that converts natural-language text into predicate-argument format as recited in claim 23, wherein said parse probability filter vetoes parse trees that fall below a minimum probability for semantic interpretation.

26. A system for ontological parsing that converts natural-language text into predicate-argument format as recited in claim 1, wherein said system is modular to permit the use of any part-of-speech-tagged ontology.

27. A system for ontological parsing that converts natural-language text into predicate-argument format as recited in claim 6, wherein said parse trees is represented by modified hexadecimal digits that have an octet of hexadecimal pairs to provide eight ontological levels and a branching factor at each node of 256.

28. A method of ontological parsing that converts natural-language text into predicate-argument format comprising the steps of:

converting a natural language sentence into a sequence of ontological entities that are tagged with part-of-speech information; and converting said sequence of ontological entities into predicate structures using a two-stage process that analyzes the grammatical structure of the natural language sentence and binds arguments into predicates.

29. A method of ontological parsing that converts natural-language text into predicate-argument format as recited in claim 28, further comprising the step of modifying said natural language sentence based on word meanings.

30. A method of ontological parsing that converts natural-language text into predicate-argument format as recited in claim 28, further comprising the steps of:

receiving sentences including ontological entities;

parsing said sentences including ontological entities into parse trees representing concepts in the corresponding sentence including ontological entities; and converting said parse trees into predicates.

31. A method of ontological parsing that converts natural-language text into predicate-argument format as recited in claim 28, wherein the step of parsing comprises the step of looking ahead one word, scanning input from left-to-right, and constructing said parse tree.

32. A method of ontological parsing that converts natural-language text into predicate-argument format as recited in claim 28, further comprising the step of removing parse trees that violate one of statistical and ontological criteria for well-formedness.

33. A method of ontological parsing that converts natural-language text into predicate-argument format as recited in claim 28, further comprising the step of vetoing parse trees having conflicts between selectional features of concepts serving as arguments to a second concept and restrictions of said second concept.

34. A method of ontological parsing that converts natural-language text into predicate-argument format as recited in claim 30, further comprising the step of assigning numbers to said concepts.

35. A method of ontological parsing that converts natural-language text into predicate-argument format as recited in claim 34, further comprising the step of subtracting said numbers to determine if features are in agreement, wherein a negative number indicates feature incompatibility.

36. A method of ontological parsing that converts natural-language text into predicate-argument format as recited in claim 34, further comprising the step of subtracting said numbers to determine if features are in agreement, wherein a non-negative number indicates agreement.

37. A method of ontological parsing that converts natural-language text into predicate-argument format as recited in claim 28, further comprising the step of vetoing parse trees that fall below a minimum probability for semantic interpretation.

38. A method of ontological parsing that converts natural-language text into predicate-argument format as recited in claim 28, wherein the step of converting the natural language sentence into the sequence of ontological entities includes data structures, wherein each data structure includes an integer value, where each digit of said integer value corresponds to a specific branch taken at a corresponding level in a parse tree.

39. A method of ontological parsing that converts natural-language text into predicate-argument format as recited in claim 38, further comprising the step of encoding in two ways: a number of grouped digits and their numerical base bounds a number of branches extending from a root node of an ontology, while at least one of said groups of digits in said integer value bounds a potential depth of said parse tree.

40. A method of ontological parsing that converts natural-language text into predicate-argument format as recited in claim 39, wherein a most significant digit difference between two nodes provides a measure of the degree of ontological proximity of two concepts.

41. A method of ontological parsing that converts natural-language text into predicate-argument format as recited in claim 38, further comprising the step of representing said parse trees by modified hexadecimal numbers that have an octet of hexadecimal pairs to provide eight ontological levels and a branching factor at each node of 256.

42. A method of ontological parsing that converts natural-language text into predicate-argument format as recited in claim 28, further comprising the step of representing said predicates and arguments by encodings comprising at least one digit separated into groups to provide multiple ontological levels and a branching factor at each node.

* * * * *